Figure 1:
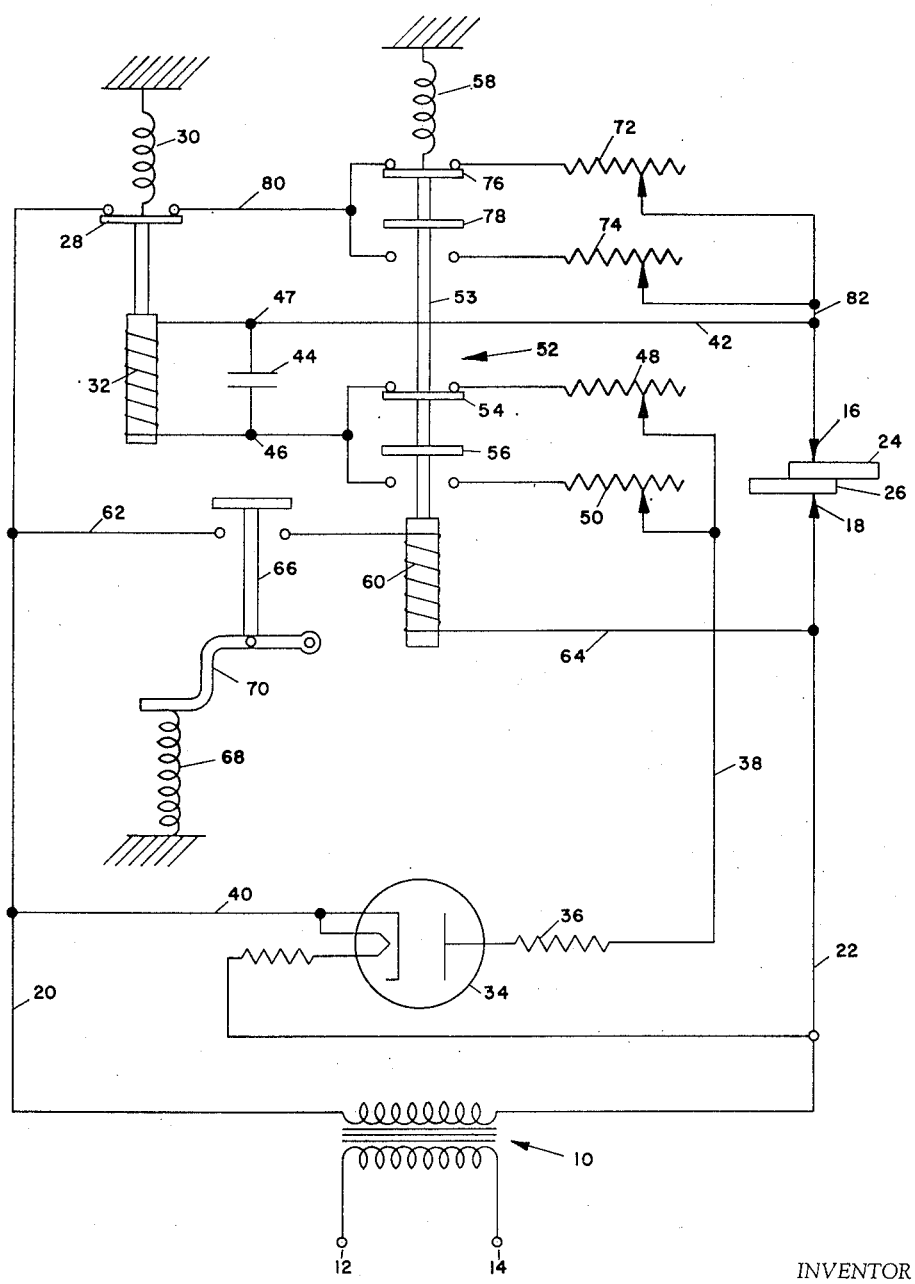

Oct. 29, 1957 K. M. SPENCER 2,811,630
HEAT AND TIME SWITCHING WELDER CONTROL
Filed March 14, 1956 2 Sheets-Sheet 1

INVENTOR
KENNETH MORRELL SPENCER

BY

ATTORNEY

Oct. 29, 1957 K. M. SPENCER 2,811,630
HEAT AND TIME SWITCHING WELDER CONTROL
Filed March 14, 1956 2 Sheets-Sheet 2

INVENTOR
KENNETH MORELL SPENCER
BY Michael Hertz
ATTORNEY

United States Patent Office 2,811,630
Patented Oct. 29, 1957

2,811,630

HEAT AND TIME SWITCHING WELDER CONTROL

Kenneth M. Spencer, Wellsboro, Pa., assignor to Sylvania Electric Products Inc., a corporation of Massachusetts Application March 14, 1956, Serial No. 571,424

7 Claims. (Cl. 219—110)

The present invention relates to improvement in electronic timing and controlling circuits and more particularly to circuits adapted for use in electric resistance welding apparatus wherein the duration and amount of current supplied to the welding contacts of such apparatus is preselectively controlled.

In spot-welding operations, particularly when welding comparatively small parts having the components thereof fabricated from materials of varying resistances or fusion points or both, it has heretofore frequently been the practice to employ the judgment of the operator to determine the amount of current utilized, or "weld-heat," and the duration of the weld, or "weld-time." The knowledge and experience thus required on the part of the operator necessitated considerable training of the operator to minimize tack welds resulting from insufficient weld-heat or weld-time or both and, on the other hand, to minimize ruptured or "burned" welds resulting from the other extremes.

In the welding of delicate parts such as those required in electronic tube manufacture, particular difficulty has been encountered. Because of the peculiar characteristics frequently demanded of such parts, they are often provided with platings, carbonized surfaces, or other types of coatings, which change the electrical resistance of the parts to an unpredictable extent. Such variations in resistance of the parts being welded has rendered operator judgment of the appropriate weld-heats and weld-times extremely difficult and unreliable, particularly because resistances of the same parts can vary from lot to lot as determined by manufacturing tolerances in the dimensions of the aforesaid coatings and parts.

Major variations in such resistances may be compensated by adjusting a current-limiting resistor, for an example, or by similarly adjusting a known weld-timing circuit; however, the aforesaid adjustments are laboriously made and accordingly add considerably to the total time utilized in the welding operation. Moreover, no prior controlling circuits are known for providing facile and variable selectability of the aforesaid weld-heats and weld-times, which can be manipulated by the operator of the welding apparatus without materially increasing the total time consumed in the welding operation, and in which the weld-timing circuit is energized by the initiation of the weld.

Accordingly, an object of the instant invention is the provision of an efficient electronic timing and heat-controlling circuit, particularly adapted for use in welding apparatus.

Another object of the invention is the provision of an electronic weld-heat and weld-time controlling circuit wherein one of a plurality of pairs of heats and times can be easily pre-selected, such that a number of materials having differing resistances or fusion points can be welded without otherwise changing the welding apparatus.

A further object of the invention is the provision of a heat and time controlling welding circuitry which is actuated by initiation of the weld being made with the associated welding apparatus, whereby operator-error in the use of said circuitry is eliminated.

Still another object of the invention is the provision of an electronic circuit for providing welding apparatus with varying weld-heats and weld-times, wherein the heats and times are individually and jointly controlled by means coupled to said circuit.

A still further object of the invention is the provision of an electronic circuit for controlling the weld-time and weld-heat of welding apparatus in which circuit means are provided for preselecting one of a plurality of heat and time relationships and for adjusting the relative values of the heat and time of each said relationships.

Yet another object of the invention is the provision of an electronic weld-heat and weld-time controlling circuit having a plurality of preselectable and variable weld-heats and weld-times which are readily reproducible.

Figure 2:
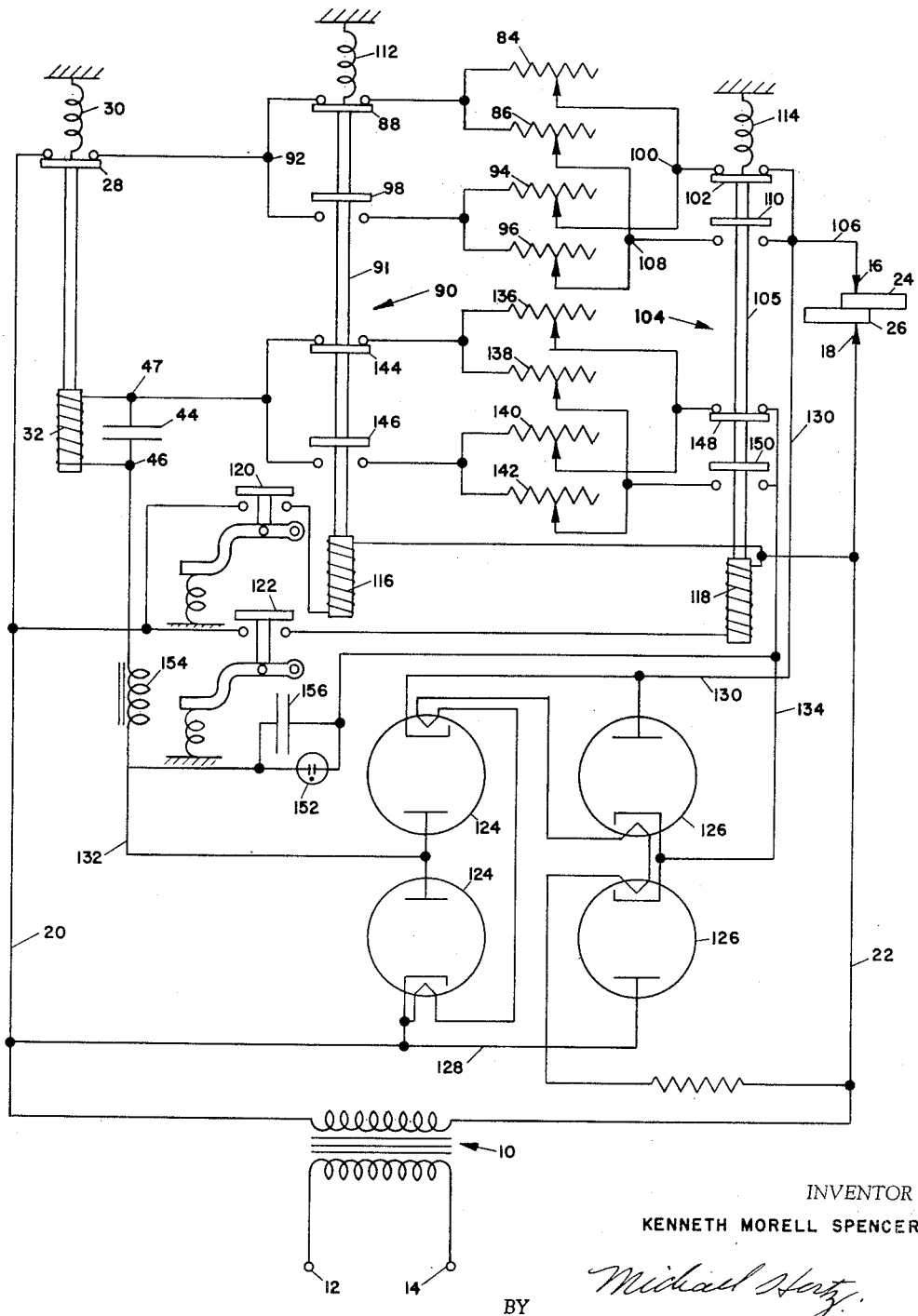

Additional objects, advantages, and features of the present invention will be made apparent during the ensuing description of illustrative embodiments of the invention, which description is intended to be read in conjunction with the accompanying drawings wherein:

Fig. 1 is a schematic representation of one examplary form of the invention constructed in accordance with the principles of this invention, and, Fig. 2 is a schematic representation of another illustrative form of the invention.

In accordance with the invention, a weld-controlling circuit is provided in which one of plurality of pairs of weld-heat and weld-time combinations can be quickly preselected by the operator of the welding apparatus and in which initiation of the weld actuates associated timing circuitry.

Referring now more particularly to Fig. 1 of the drawings, the exemplary form of the invention illustrated therein comprises a welding transformer 10, the primary of which is connected to a source of alternating potential represented by terminals 12 and 14, and a pair of welding electrodes 16 and 18 connected to the secondary of the transformer 10 via conductors 20 and 22, and applied to overlapping parts 24 and 26, which are to be welded by passing current through the parts from one electrode to the other. Conventional means (not shown) controlled by the operator of the welding apparatus are provided for causing the electrodes 16 and 18 to contact the parts 24 and 26 in order to pass welding current therethrough.

A biasedly closed electromagnetic switch 28 is connected in series relationship to the welding electrodes 16 and 18 in the secondary circuit of the transformer 10. The switch 28 is maintained normally in the closed position by a biasing spring 30 and is arranged to be opened by energization of a coil 32. Circuit controlling timing means are provided for selectively delaying the energization of the coil 32 for an interval following the application of welding current to the parts 24 and 26, which means is actuated by the application of the aforesaid current. The aforementioned interval corresponds to the duration of the application of welding current to the parts 24 and 26, that is to say, the weld-time.

One form of such circuit means includes a current rectifying device, for an example a half-wave rectifier tube 34 having the anode thereof connected through a current limiting resistor 36 and conductor 38 to the coil 32. In the disclosed circuit the current flows from the left hand side of the secondary of transformer 10 through lines 20, 40 rectifier 34, resistor 36, line 38, a resistor and switch combination to be described, to coil 32; thence from coil 32 via line 42 through the electrodes and the work 24, 26 to line 22 and the right hand side of the secondary of transformer 10. It is thus assured that the circuit controlling means is not actuated until welding of the parts 24 and 26 is initiated. A condenser 44, connected across terminals 46 and 47 of the coil 32, is arranged to absorb the rectified potential applied to the said terminals during the charging period of the condenser sufficient to delay energization of the coil 32, and the consequent opening of the switch 28. The effective charging interval of the condenser and therefore the interval in which the switch 28 remains closed after initiation of the weld, corresponds to the weld-time of the associated welding apparatus, and is variably and selectively controlled by the operator of said apparatus in a manner presently to be described.

According to one form of the invention, the aforementioned charging interval is varied by a pair of parallelly disposed condenser-charging resistances 48 and 50 which can be selectively coupled into the plate circuit of the tube 34, for an example, in series relationship with the terminal 46 and the plate resistance 36. One means for effecting the aforesaid selective coupling includes electromagnetic switch means, for example, a solenoid-operated switch 52 and two contacts 54 and 56 which are arranged to connect alternatively the branch circuits containing the charging resistances 48 and 50, respectively, into the aforesaid plate circuit. The switch 52 is biased upwardly, as by connection with the tension spring 58, such that contact 54 is urged upwardly into operative engagement with the branch circuit connecting resistance 48 to the terminal 46. The condenser-charging branch circuit including the resistance 50 is alternatively connected to the terminal 46 by energization of coil 60 thereby causing the contact 56 to move downwardly into circuit-making engagement with the lower contacts of the switch. The coil 60 is coupled across the secondary leads 20 and 22, via conductors 62 and 64 and in series with, in this example, an operator-controlled switch 66 normally urged into the open-circuit position by a compressed spring 68. To conserve operator-time in selecting the proper weld-time for welding the parts 24 and 26, the switch 66 is conveniently actuated by a pedal 70.

The resistances 48 and 50 are preferably provided in the form of variable resistors or rheostats in order that any two frequently used weld-times within the limits of the resistances may be preselected by adjustment of the resistances 48 and 50. When such a pair of weld-times is thus set, either one may be quickly and easily selected by suitable manipulation of the pedal-operated switch 66. If desired, each of the resistances 48 and 50, when provided in the form of rheostats, can be equipped with appropriate dial plates or scales (not shown) to indicate and to record accurately the setting thereof for future reference in the welding of similar parts.

As described heretofore, the welding electrodes 16 and 18 and the electromagnetic switch 28 are coupled in series relationship with one another in the secondary circuit of the transformer 10. Likewise, coupled therein are circuit means actuated preferably by the pedal operated switch 66 for preselectively and variably controlling the weld-heat of the welding apparatus by variably limiting the amount of current flowing through the parts 24 and 26 when the weld is made by such apparatus. One form of weld-heat controlling circuitry comprises a pair of parallelly disposed branch circuits, each including a current-limiting resistor 72 or 74 and a switch contact 76 or 78, respectively. The aforementioned branch circuits are connected in parallel via conductors 80 and 82 to the welding electrode 16 and a terminal of the switch 28. Obviously the parallel heat-controlling circuits may be similarly disposed elsewhere in the secondary circuit of transformer 10 so long as they are collectively coupled in series relationship to the welding electrodes 16 and 18 and switch 28.

In order that a number of pairs of weld-heats and weld-times be desirably available for quick selection, the switch contacts 76 and 78 are mounted on the plunger 53 of the solenoid-operated switch 52, as are the contacts 54 and 56. Thus the contacts 76 and 54 are normally urged into the circuit-engaging position relative to the current-limiting resistance 72 and condenser-charging resistance 48, respectively, or, by operation of switch 66, contacts 78 and 56 are pulled downwardly by coil 60 into circuit-engaging position relative to resistances 74 and 50 respectively. For this arrangement, resistances 72 and 74 are similarly provided in adjustable form and may each be equipped with a dial plate or other scaled indicia, for presetting the available weld-heats. Obviously a greater number of preselectable weld-heat and weld-time pairs can be made available, as by providing a correspondingly greater number of branch condenser-charging and current-limiting resistances, selected by a multi-position switch (not shown) or the like, or by means presently to be described.

Another form of the controlling circuit constructed in accordance with the principles of this invention and arranged for quickly selecting one from a number of presettable pairs of weld-heats and weld-times is illustrated in Fig. 2, wherein similar reference characters refer to similar circuit components as utilized in Fig. 1. As described in connection with Fig. 1, a pair of welding electrodes 16 and 18 are connected, in series relationship with a biasedly closed electromagnetic switch 28, in the secondary circuit of the welding transformer 10, via the conductors 20 and 22. Also coupled to the secondary circuit in series with the welding contacts 16 and 18 are a number of parallelly disposed resistance paths and means for completing the circuit through any one of said paths and thereby selecting the desired weld-heat as dictated by the amount of current to be passed through the parts 24 and 26. The aforesaid resistance paths include a first pair of parallel resistances 84 and 86 connectible, through a contact 88 of a first solenoid-operated switch 90 and a conductor 92 to a terminal of the switch 28. A second pair of resistances 94 and 96 are similarly connected through a switch contact 98 and the conductor 92 to the said terminal. One each of the aforementioned pairs of resistances, for an example, the resistances 84 and 94 is coupled via a conductor 100, a contact 102 of a second solenoid-operated switch 104, and a conductor 106 to the welding electrode 16. The remaining resistances 86 and 96 are similarly connectible thereto through conductor 108, a switch contact 110, and conductor 106. The solenoid-operated switches 90 and 104 are biased upwardly by individual tension springs 112 and 114 so that the respective contacts 88 and 102 are urged toward their circuit-making position. By selective energization of coils 116 and 118, by means presently to be described, either or both of the plungers 91 and 105, respectively of switches 90 and 104, can be actuated downwardly to the respective circuit-making positions of contacts 98 and 110. As is readily apparent, by actuation of the switches 90 and 104, the flow of current through the secondary circuit is selectively restricted to any one unit of the resistances 84, 86, 94 or 96. Thus with the switches 90 and 104 in the positions shown, current can flow only through the resistance 84. The coils 116 and 118 are, in this form of the invention, individually energized by means of pedal operated switches 120 and 122 connected respectively to the coils 116 and 118 and in parallel relationship to one another across the secondary leads 20 and 22 of the transformer 10.

As fully explained in connection with Fig. 1, the timing condenser 44 is shunted across the coil 32 of the welding switch 28 in order to delay energization thereof. A rectified voltage, necessary for properly energizing the coil 32, as is well known in the art, is supplied thereto, for an example, by a full-wave rectifying unit including series-parallel connected pairs of rectifying tubes 124 and 126. The operational details of each unit are well understood and accordingly a fuller explanation is not deemed necessary. The rectifying unit is connected, through conductors 128 and 130, in series relationship to the welding electrodes 16 and 18 so that rectified or load potential is applied to the terminals 46 and 47 of the coil 32, via conductors 132 and 134 only after the electrodes 16 and 18 are brought into welding engagement with the parts 24 and 26 and current flows therethrough.

A multi-pathed charging resistance for the timing condenser 44 is coupled in series-relationship therewith in the load circuit of the rectifying unit. The multi-pathed resistance in this example comprises first and second pairs of resistances 136 and 138, 140 and 142 connectible respectively through switch contacts 144 and 146 to the coil terminal 47. The resistances are then re-paired in the manner described in connection with resistances 84, 86, 94 and 96 for coupling into the load circuit of the rectifying unit, through respective switch contacts 148 and 150 and the conductor 134.

In order that the weld-heats represented by current-limiting resistances 84, 86, 94 and 96 be desirably paired with the weld-times corresponding to condenser-charging resistances 136, 138, 140 and 142, the pairs of switch contacts 144 and 146, 148 and 150 are mounted respectively on the plungers 91 and 105 of the switches 90 and 104. The said contacts then are operable to couple any one of the resistances 136, 138, 140 and 142 into the load circuit of the rectifying unit in a manner described heretofore in connection with the current limiting resistances. Thus, when the pedal-operated switches 120 and 122 are both closed, the switch contacts 98, 110, 146 and 150 are actuated downwardly to the closed-circuit positions such that only the resistances 96 and 142 are coupled, respectively, in series with the welding electrodes 16 and 18, and in series with the condenser 44. Each of the aforesaid resistances are, in the foregoing example, made adjustable in order that the pairs of associated weld-heats and weld-times can be variably preselected within the limits of adjustability of the resistances and so that each component of a paired weld-heat and weld-time combination can be varied relative to one another and to the other components.

The welding circuits of Figs. 1 and 2 can be provided with either of the rectifying units illustrated in Figs. 1 and 2 or with any other suitable arrangement. More accurate operation of the disclosed timing circuit results from the employment of the full-wave rectifying arrangement of Fig. 2, however. For applications requiring still more accurate control a filter network can be inserted into the load circuit of the rectifying tubes 124 and 126. One form of filter network (Fig. 2) includse a voltage regulating tube 152 connected across the output leads 132 and 134, respectively, of the tubes 124 and 126. A choke coil 154 and a condenser 156 are connected in series and in parallel, respectively, in the rectifier load circuit for smoothing the current and potential fluctuations, respectively, of the rectified output.

From the foregoing description, it will be apparent that novel and efficient timing and heat-controlling circuits have been disclosed herein as arranged particularly for use with welding apparatus but equally adapted for other applications requiring similarly controlled conditions. Obviously, modifications of the disclosed circuit arrangements will occur to those skilled in the use thereof without departing from the spirit and scope of the present invention as defined in the appended claims.

Accordingly, what is claimed as new is:

1. In a controlling circuit for use with welding apparatus having welding electrodes movable to a position of engagement with parts being welded, a circuit for connecting said electrodes to a source of electric potential, normally closed switch means connected in said circuit in series with said electrodes, current-limiting resistance connected in said circuit in series with said electrodes, and a timing circuit coupled to said switch means and arranged to open said switch means an interval after said engagement, said timing circuit being connected in parallel with said resistance and in series with said electrodes, whereby current flowing through said electrodes initiates the operation of said timing circuit.

2. In a controlling circuit for use with welding apparatus having welding electrodes movable to a position of engagement with parts being welded, a circuit for connecting said electrodes to a source of electric potential, normally closed switch means connected in said circuit in series with said electrodes, current limiting resistance connected in said circuit in series with said electrodes, and a timing circuit coupled to said switch means and arranged to open said switch means an interval after said engagement, said timing circuit being connected in parallel with said resistance and with said switch means and in series with said electrodes, whereby current flowing through said electrodes initiates the operation of said timing circuit.

3. In a controlling circuit for use with welding apparatus having welding electrodes movable to a position of engagement with parts being welded, a first circuit for connecting said electrodes to a source of electric potential, a normally closed electromagnetic switch connected in said circuit in series with said electrodes, a plurality of parallel-coupled current-limiting resistances connected in said circuit in series with said electrodes, switch members individually coupled to each of said resistances, first operable means for moving, at will, one of said switch members to circuit closing position, a timing circuit including a capacitor shunting the coil of said switch, a plurality of parallel-coupled capacitor-charging resistances connected in series with said coil, switch members individually coupled to each of said second-mentioned resistances, second operable means for moving, at will, one of said second-mentioned switch members to circuit closing position, a second circuit arranged to connect said timing circuit to said first circuit in series with said electrodes and in parallel with said current-limiting resistances, whereby current flowing through said electrodes initiates the operation of said timing circuit.

4. In a controlling circuit for use with welding apparatus having welding electrodes movable to a position of engagement with parts being welded, a first circuit for connecting said electrodes to a source of electric potential, a normally closed electromagnetic switch connected in said circuit in series with said electrodes, a plurality of parallel-coupled current-limiting resistances connected in said circuit in series with said electrodes, switch members individually coupled to each of said resistances, first operable means for moving, at will, one of said switch members to circuit closing position, a timing circuit including a capacitor shunting the coil of said switch, a plurality of parallel-coupled capacitor-charging resistances connected in series with said coil, switch members individually coupled to each of said second-mentioned resistances, second operable means for moving, at will, one of said second-mentioned switch members to circuit closing position, said second operable means being coupled to said first operable means for movement therewith, a second circuit arranged to connect said timing circuit to said first circuit in series with said electrodes and in parallel with said current-limiting resistances, whereby current flowing through said electrodes initiates the operation of said timing circuit.

5. In a controlling circuit for use with welding apparatus having welding electrodes movable to a position of engagement with parts being welded, a first circuit for connecting said electrodes to a source of electric potential, a normally closed electromagnetic switch connected in said circuit in series with said electrodes, a plurality of parallel-coupled current-limiting resistances connected in said circuit in series with said electrodes, each of said resistances being individually variable, switch members individually coupled to each of said resistances, first operable means for moving, at will, one of said switch members to circuit closing position, a timing circuit including a capacitor shunting the coil of said switch, a plurality of parallel-coupled capacitor-charging resistances connected in series with said coil, each said second-mentioned resistances being individually variable and equal in number to said first mentioned resistances, switch members individually coupled to each of said second-mentioned resistances, second operable means for moving, at will, one of said second-mentioned switch members to circuit closing position, said second operable means being coupled to said first operable means for movement therewith, a second circuit arranged to connect said timing circuit to said first circuit in series with said electrodes and in parallel with said current-limiting resistances, whereby current flowing through said electrodes initiates the operation of said timing circuit.

6. In a controlling circuit for use with welding apparatus having welding electrodes movable to a position of engagement with parts being welded, a first circuit for connecting said electrodes to a source of electric potential, a normally closed electromagnetic switch connected in said circuit in series with said electrodes, at least two pairs of parallel-coupled current-limiting resistances connected in said circuit in series with said electrodes, first switch members individually and electrically connected to each pair of said resistances, and to said switch, one of each pair of resistances being connected together at one terminal thereof, each of the groups thus formed being individually coupled through second switch members to one of said electrodes, first means for moving, at will, one of said first switch members to closed circuit position, second means for moving, at will, one of said second switch members to closed circuit position, a timing circuit including a capacitor shunting the coil of said switch, at least two pairs of parallel-coupled capacitor-charging resistances connected in series with said coil, each pair thereof being connected individually through third switch members to said coil, connections for coupling the terminals of one resistance in each second-mentioned pair of resistances to individual fourth switch members, third means for moving, at will, one of said third switch members to closed circuit position, fourth means for moving, at will, one of said fourth switch members to closed circuit position, a second circuit arranged to connect said timing circuit to said first circuit in series with said electrodes.

7. The controlling circuit according to claim 6 characterized further in that said first and third means and said second and fourth means are mechanically coupled for common movement, respectively, and that each said current-limiting resistances and said capacitor-charging resistances are individually variable.

References Cited in the file of this patent

UNITED STATES PATENTS

| | | |
|---|---|---|
| 1,230,357 | Woodrow | June 19, 1917 |
| 1,959,690 | Roth | May 22, 1934 |
| 2,023,631 | Wright | Dec. 10, 1935 |
| 2,024,019 | Wright | Dec. 10, 1935 |